United States Patent
Swaidan et al.

(10) Patent No.: US 10,112,149 B2
(45) Date of Patent: Oct. 30, 2018

(54) METALLOPOLYIMIDE PRECURSOR FIBERS FOR AGING-RESISTANT CARBON MOLECULAR SIEVE HOLLOW FIBER MEMBRANES WITH ENHANCED SELECTIVITY

(71) Applicant: L'Air Liquide, Societe Anonyme pour l'Etude et l'Exploitation des Procedes Georges Claude, Paris (FR)

(72) Inventors: Raja Swaidan, Freemont, CA (US); David J. Hasse, Middletown, DE (US); Madhava R. Kosuri, Newark, DE (US); Canghai Ma, Newark, DE (US); Robert A. Gagliano, Cochranville, PA (US); Henri Chevrel, Bryn Mawr, PA (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/199,911

(22) Filed: Jun. 30, 2016

(65) Prior Publication Data

US 2018/0001271 A1    Jan. 4, 2018

(51) Int. Cl.
*B01D 53/22* (2006.01)
*B01D 69/08* (2006.01)
(Continued)

(52) U.S. Cl.
CPC ......... *B01D 69/087* (2013.01); *B01D 53/228* (2013.01); *B01D 67/0067* (2013.01);
(Continued)

(58) Field of Classification Search
CPC  B01D 71/028; B01D 67/0067; B01D 69/087; B01D 53/228; B01D 2325/28; B01D 71/64
See application file for complete search history.

(56) References Cited

U.S. PATENT DOCUMENTS 3,234,181 A * 2/1966 Olivier .................. C08G 73/10
  524/600
4,975,190 A * 12/1990 Sakashita ............... B01D 63/02
  210/500.23
(Continued)

FOREIGN PATENT DOCUMENTS

JP   2003 053167   2/2003
JP   2010 269229   12/2010
WO  WO 2017 189 522   11/2017

OTHER PUBLICATIONS

Barsema, et al, "Ag-Functionalized Carbon Molecular-Sieve Membranes Based on Polyelectrolyte/Polyimide Blend Precursors," Adv. Funct. Mater. 15, No. 1, Jan. 2005.
(Continued)

*Primary Examiner* — Anthony R Shumate
(74) *Attorney, Agent, or Firm* — Christopher J. Cronin

(57) ABSTRACT

Metallopolyimide precursor fibers for aging-resistant carbon molecular sieve hollow fiber membranes having enhanced selectivity include transition metal cations complexed with electronegative regions of a polyimide. CMS membranes are made by pyrolyzing the metallopolyimide precursor fibers. The cations are introduced by including, in the spin dope composition used to extrude the fibers, either a salt of the transition metal and an inorganic anion or a transition metal/organic ligand complex.

16 Claims, 3 Drawing Sheets

(51) Int. Cl.
*B01D 71/02* (2006.01)
*B01D 67/00* (2006.01)
*B01D 71/64* (2006.01)

(52) U.S. Cl.
CPC ........... *B01D 71/028* (2013.01); *B01D 71/64* (2013.01); *B01D 2325/28* (2013.01)

(56) References Cited

U.S. PATENT DOCUMENTS

| | | | | |
|---|---|---|---|---|
| 5,181,941 | A * | 1/1993 | Najjar | B01D 53/228 205/231 |
| 5,804,672 | A * | 9/1998 | Bolte | B32B 7/12 525/438 |
| 6,046,107 | A * | 4/2000 | Lee | C23C 18/40 427/304 |
| 6,565,631 | B2 | 5/2003 | Koros et al. | |
| 7,033,648 | B1 * | 4/2006 | Doany | C23C 18/1605 216/65 |
| 7,947,114 | B2 | 5/2011 | Hagg et al. | |
| 8,617,292 | B2 | 12/2013 | Hasse et al. | |
| 9,636,639 | B2 * | 5/2017 | Ansari | B01D 71/022 |
| 2005/0069700 | A1 * | 3/2005 | Chung | B01D 67/0011 428/364 |
| 2005/0214613 | A1 * | 9/2005 | Sarkar | B01D 53/228 429/454 |
| 2006/0163071 | A1 * | 7/2006 | Siwy | B01D 61/425 205/67 |
| 2006/0292383 | A1 * | 12/2006 | Kohayashi | B32B 15/08 428/457 |
| 2008/0038567 | A1 * | 2/2008 | Way | B01D 53/228 428/457 |
| 2011/0100211 | A1 | 5/2011 | Kiyono et al. | |
| 2011/0290112 | A1 | 12/2011 | Liu et al. | |
| 2012/0048109 | A1 | 3/2012 | Chinn et al. | |
| 2013/0122187 | A1 * | 5/2013 | Saukaitis | B01D 67/0069 427/8 |
| 2015/0343390 | A1 * | 12/2015 | Ansari | B01D 53/228 210/500.25 |
| 2015/0353696 | A1 * | 12/2015 | Sano | C08J 5/2231 428/220 |
| 2015/0353721 | A1 * | 12/2015 | Takamoto | C08F 222/385 442/59 |

OTHER PUBLICATIONS

Barsema, et al., "Functionalized Carbon Molecular Sieve membranes containing Ag-nanoclusters," Journal of Membrane Science, 219, 2003, pp. 47-57.

Chua, et al., "Using iron (III) acetylacetonate as both a cross-linker and micropore former to develop polyimide membranes with enhanced gas separation performance," Separation and Purification Technology, 133, 201, pp. 120-128.

Lie, et al., "Carbon membranes from cellulose and metal loaded cellulose," Carbon, 43, 2005, pp. 2600-2607.

International Search Report and Written Opinion for PCT/US2017/040210, dated Sep. 27, 2017.

Robeson, Lloyd M., "The upper bound revisited," Journal of Membrane Science, vol. 320, pp. 390-400 (2008).

* cited by examiner

METALLOPOLYIMIDE PRECURSOR FIBERS FOR AGING-RESISTANT CARBON MOLECULAR SIEVE HOLLOW FIBER MEMBRANES WITH ENHANCED SELECTIVITY

CROSS-REFERENCE TO RELATED APPLICATIONS

None.

BACKGROUND

Field of the Invention

The present invention relates to carbon molecular sieve membranes and gas separations utilizing the same.

Related Art

Membranes are often preferred to other gas separation techniques in industry due to the following advantages. The energy consumption for membranes is low as they do not require a phase change for separation. Membrane modules are compact, thereby reducing their footprint and capital cost. Membranes are also mechanically robust and reliable because they have no moving parts.

Polymer membranes in particular are used in a wide variety of industrial applications. They enable the production of enriched nitrogen from air. They separate hydrogen from other gases in refineries. They are also used to remove carbon dioxide from natural gas.

However, owing to the manufacturing processes and material structure, today's polymeric membranes cannot reach both high selectivities and permeabilities, because a trade-off exists between permeability and selectivity. Robeson formulated semi-empirical upper-bound trade-off lines for several gas pairs. (Robeson, "The upper bound revisited", Journal of Membrane Science 2008, vol 320, pp 390-400 (2008)). Carbon membranes exceed this upper-bound and therefore are quite promising.

Carbon molecular sieve membranes (CMS membranes) may be obtained by high-temperature pyrolysis under oxygen-deficient atmospheres of polymer precursors. They offer attractive gas separation properties relative to the precursor polymer mainly characterized by higher permeance, higher selectivity, a tolerance to higher process gas temperatures, and a resistance to plasticization-induced selectivity losses due to condensable components in gas feeds. That is, CMS membranes bypass the traditional tradeoffs between permeability and selectivity that polymer membranes suffer from, yielding simultaneously higher productivity and higher product purity. To further improve the module productivity per unit volume, the membranes can be produced in a hollow-fiber geometry. Together with plasticization resistance, these properties render CMS hollow-fiber membranes ideal candidates for many separations, including natural gas upgrading and olefin/paraffin separations.

The gas transport properties of the CMS membrane are strongly dependent upon those of the polymer precursor. Glassy polyimides are particularly attractive precursors partly because of their thermochemical properties: high decomposition temperatures, high carbon content, and high glass transition temperatures (Tg). It has been shown that the use of a high-free-volume precursor polymer with a high Tg (e.g., 6FDA/BPDA-DAM) results in a CMS membrane with a higher permeance than that derived from a low-free-volume precursor polymer with a lower Tg (e.g., Matrimid). In this particular example, the higher Tg is thought to help prevent collapse of the polymer structure during temperature ramping in pyrolysis and thus to promote the maintenance of the high free volume and permeance in the CMS membrane.

However, one of the primary drawbacks hindering the commercialization of CMS membranes is the severe "aging" behavior they undergo, shown by prominent reductions in gas permeance with time. This impedes the design of economical processes around the CMS membranes. A body of literature suggests that the aging is primarily "physical" in nature, being due to an in-situ, intrinsic "collapse" of the thin separating layer. Contributions of "chemical aging" due to sorption of ambient oxygen or other molecules have been minimized by demonstration of aging behavior under vacuum. With Struik's theories on aging in mind, the pyrolysis-induced mass loss results in a higher surface area and associated higher free volume in the CMS membrane in comparison to the precursor membrane. This higher free volume dissipates naturally over time as a denser "equilibrium" packing is reached. This phenomenon is illustrated in FIG. 1. After pyrolysis of the polyimide of the green fiber to produce the CMS membrane fiber, the spacing in between polymer chains begins at a first value, say, $\delta_1$. Over time, the physical-aging densification of the thin separating layer causes that spacing to decrease to a second value, say, $\delta_2$, where $\delta_1 >> \delta_2$. This is known to occur more rapidly in the relatively thinner (~100 nm) separating layers that are characteristic of industrial gas separation membranes. Therefore, high permeance CMS membranes derived from high-free-volume precursors like 6FDA/BPDA-DAM made according to conventional techniques do not appear to retain their advantage in permeance upon aging. Indeed, there can sometimes be an orders of magnitude decrease after aging. The aging effect can generally be observed within one week of formation of the CMS membrane fibers.

Metals have been added into carbon molecular sieve membranes for a variety of purposes.

U.S. Pat. No. 7,947,114 discloses production of CMS membranes (made by pyrolyzing cast films of cellulosic materials and metal salts for purposes of performing electroregeneration of the CMS membranes, whereby the conductivity of the membrane is improved so that an electric current can be used to heat the membrane and assist in removal of adsorbed contaminants.

Lie, et al. discloses production of CMS membranes (made by pyrolyzing cast films of cellulosic materials and metal salts. Lie, et al., Carbon membranes from cellulose and metal loaded cellulose, Carbon 43 (2005) 2600-2607. Each of the CMS membranes incorporating a metal salt exhibited significant aging effect while comparative CMS membranes without metal salts did not exhibit aging.

Barsema, et al. discloses production of silver nanocluster-containing CMS membranes (made by pyrolyzing cast films of polymer and either $AgNO_3$ or $CH_3COOAg$), partly for the purpose of achieving facilitated transport of a gas. Barsema, et al., Functionalized carbon molecular sieve membranes containing Ag-nanoclusters, Journal of Membrane Science 219 (2003) 47-57. The aging effect was not studied.

Therefore it is an object of the invention to provide a CMS membrane (and method of making the same) that does not experience the aging effect exhibited by conventional CMS membranes and thus retain their advantage in permeance.

SUMMARY

There is disclosed a method for producing a metallopolyimide precursor fibers for aging-resistant carbon molecular sieve hollow fiber membranes having enhanced selectivity that comprises the following steps. A bore fluid is ejected from a circular opening in a hollow fiber spinneret. A spin dope composition comprising a polyimide dissolved in a solvent is prepared. The spin dope composition is extruded from an annular opening that surrounds the circular opening. The extruded core spin dope composition is allowed to traverse an air or inert gas gap to produce a nascent hollow fiber. The nascent hollow fiber is allowed to travel through a coagulation bath of a cations of a transition metal dissolved in a non-solvent in which still-dissolved portions of the polyimide in the nascent hollow fiber are solidified via phase inversion, wherein the cations diffuse into the solidified fiber where they complex with electronegative regions of the polyimide. The solidified hollow fiber is dried.

There is also disclosed a plurality of the dried solidified hollow fibers produced by the above-recited method. There is further provided a method for producing an aging-resistant CMS hollow fiber membranes having enhanced selectivity, comprising the step of pyrolyzing the afore-mentioned dried solidified hollow fibers. There is further provided aging-resistant CMS hollow fiber membranes produced by the afore-mentioned method.

There is further disclosed a method for separating a gas mixture, comprising the steps of feeding a gas mixture to a CMS membrane module comprising a plurality of the above-mentioned aging-resistant CMS hollow fiber membranes that comprises the following steps. A permeate gas is withdrawn from the CMS membrane module that is enriched in at least one gas relative to the gas mixture. A non-permeate gas is withdrawn from the CMS membrane module that is deficient in said at least one gas relative to the gas mixture.

Any one or more of the above-recited methods, dried solidified hollow fibers, and aging-resistant CMS membrane fiber membranes may include one or more of the following aspects:

the complexed cations are not substantially removed from the solidified hollow fiber by the coagulation bath.

the solidified hollow fiber is washed with a wash liquid so as to remove solvent from the solidified hollow fiber, wherein the complexed cations are not substantially removed from the solidified hollow fiber by the wash liquid.

the transition metal is selected from the group consisting of Sc, Ti, Va, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, and Gd.

the transition metal cations are in a +2 or +3 oxidation state.

the cation is selected from the group consisting of Fe(ii), Fe(iii), Ag(ii), Ag(iii), Zn(ii), and Zn(iii).

the spin dope composition is prepared by mixing the polyimide, the solvent and a transition metal salt of the metal cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

the anion is nitrate.

the cation is Fe(iii).

the spin dope composition is prepared by mixing the polyimide, the solvent and a metalorganic, the metalorganic being cation of a transition metal complexed with an organic ligand, the ligand being selected from the group consisting of acetylacetonate, acetate, oxalate, and citrate.

the bore fluid comprises water and a transition metal salt of the metal cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

the bore fluid comprises water and a metalorganic, the metalorganic being a cation of a transition metal complexed with an organic ligand in the bore fluid, the ligand being selected from the group consisting of acetylacetonate, acetate, oxalate, and citrate.

the coagulation bath comprises water and a salt of the cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

the coagulation bath comprises water and a metalorganic, the metalorganic being a complex of the cation and an organic ligand, the ligand being selected from the group consisting of acetylacetonate, acetate, oxalate, and citrate.

the wash liquid is prepared by mixing water and a transition metal salt of the metal cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

the wash liquid is prepared by mixing an alcohol and a transition metal salt of the metal cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

the wash liquid is prepared by mixing water and a metalorganic, the metalorganic being cation of a transition metal complexed with an organic ligand, the ligand being selected from the group consisting of acetylacetonate, acetate, oxalate, and citrate.

the wash liquid is prepared by mixing an alcohol and a metalorganic, the metalorganic being cation of a transition metal complexed with an organic ligand, the ligand being selected from the group consisting of acetylacetonate, acetate, oxalate, and citrate.

the ligand is acetylacetonate.

the cation is Fe(iii) or Zn(ii).

the polyimide is 6FDA/BPDA:DAM and the metal cation complexed with an organic ligand is tris(acetylacetonato) iron(III).

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
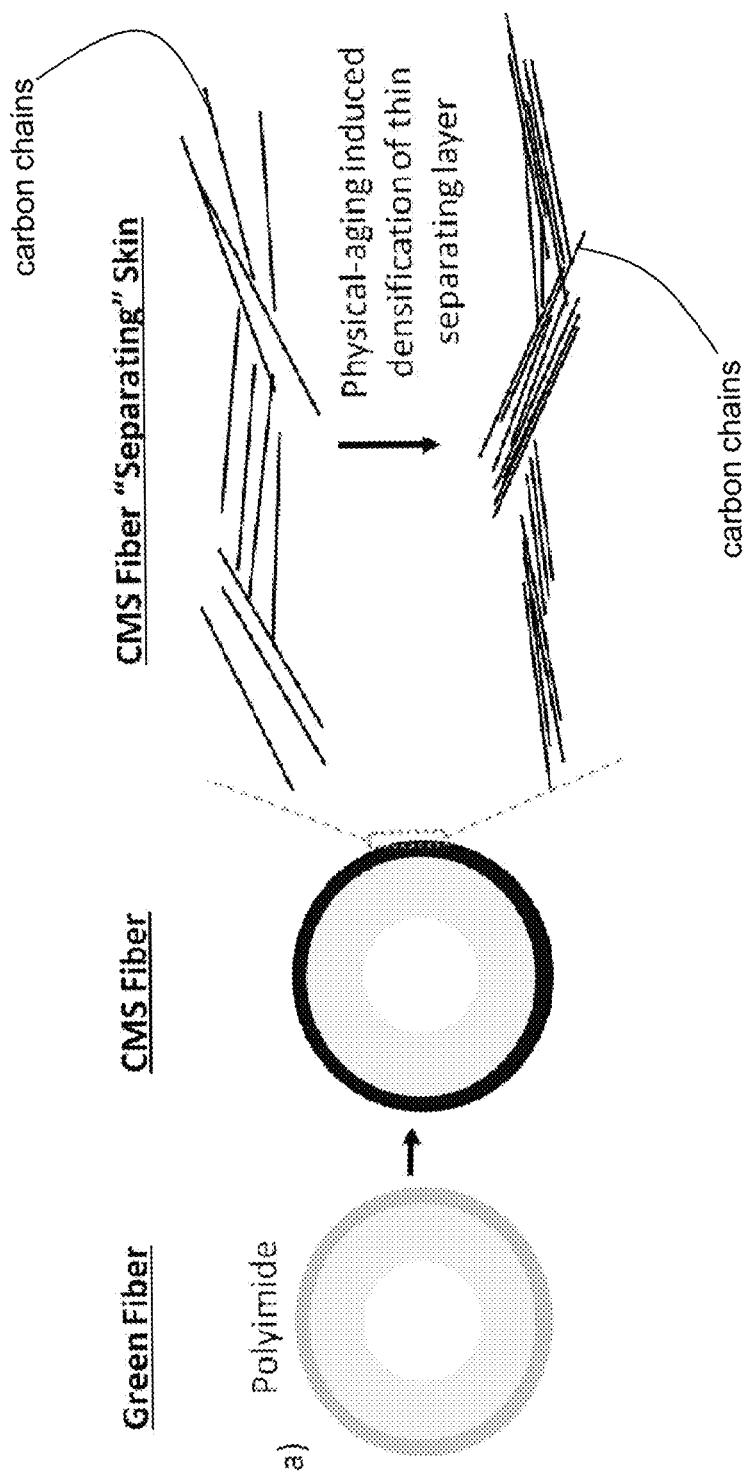
FIG. 1 is a schematic visualization of the aging effect in CMS membranes.
Figure 2:
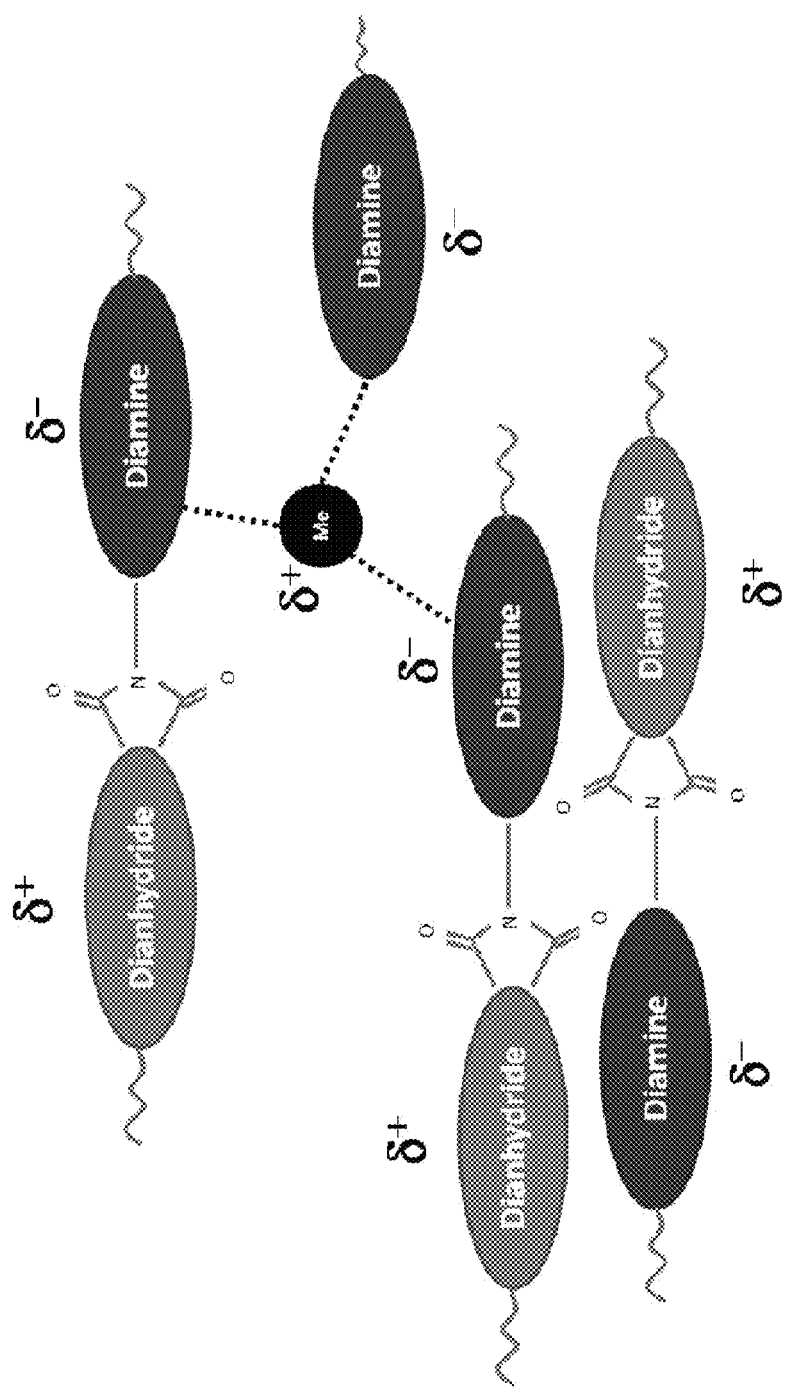
FIG. 2 is an illustration of the complexation between the metal cations and the electronegative regions of the polyimide chain in the invention.

According to the invention, metal cations are first immobilized in a polyimide hollow fiber membrane via complexation with the electronegative regions of the polyimide backbone. Polyimides form charge-transfer-complexes (CTCs) by virtue of alternating regions of positive and negative charges along their backbones, primarily across the N-phenyl imide bond between the diamine and dianhydride moieties. For example and as best illustrated in FIG. 2, a metal cation having a +3 oxidation state complexes with the relatively electronegative diamine segment of three adjacent polyimide chains (as opposed to the relatively electropositive dianhydride segments).

Figure 3:
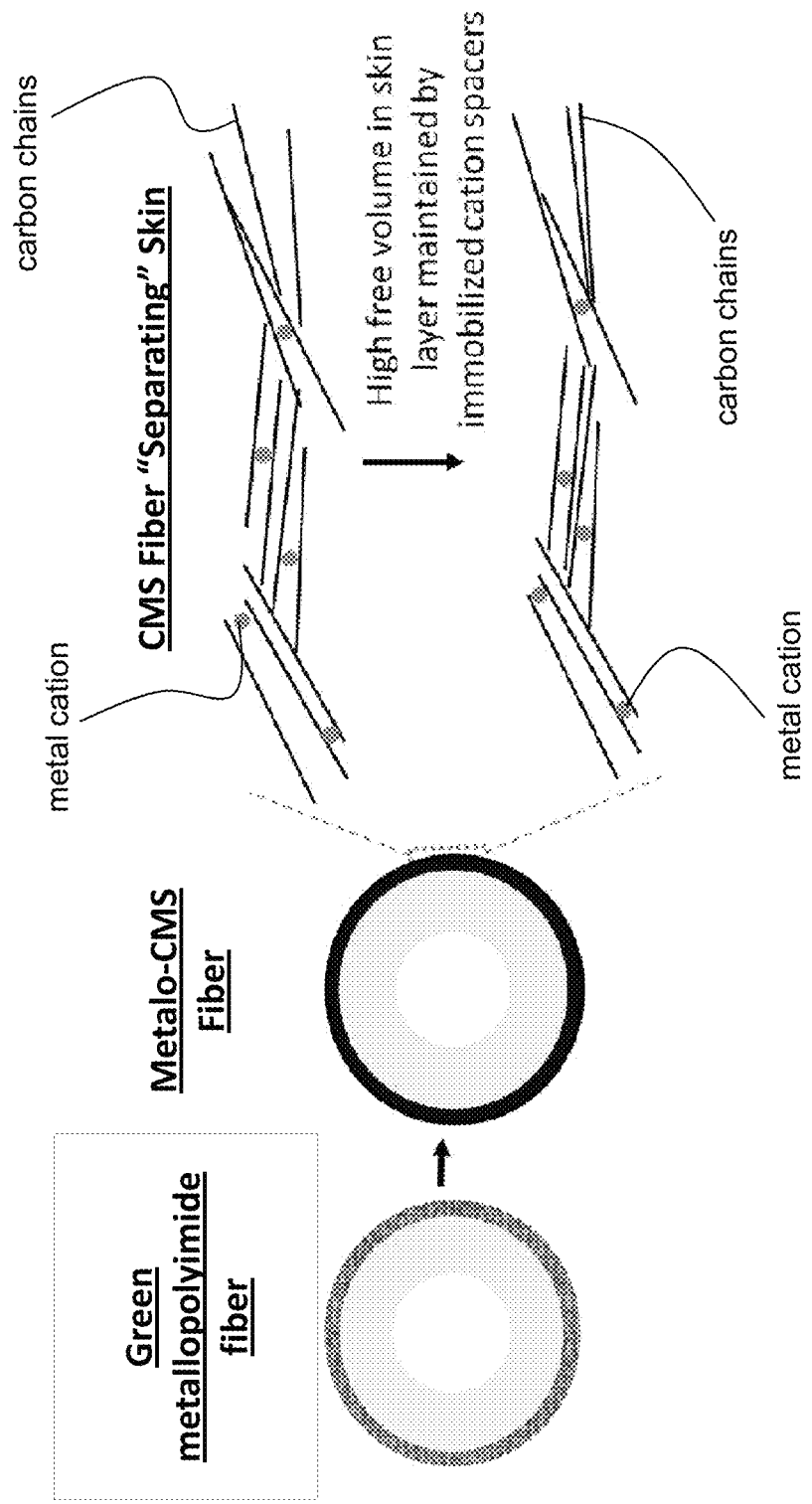
FIG. 3 is a schematic visualization of the inhibition or prevention of the aging effect in the invention.

As best illustrated in FIG. 3, subsequently, the green polyimide hollow fiber membrane is pyrolyzed to form the metallo-CMS membrane. Without being bound by any particular theory, we believe that, over the passage of time and as a result of aging, the spacing in between adjacent carbon chains and/or sheets in the freshly produced metallo-CMS membrane that do not sandwich cations will tend to decrease while the spacing in between adjacent carbon chains and/or sheets that do sandwich cations remains at about a same value. The presence of the metal atoms between those chains and/or sheets inhibits them from assuming lower-energy packing configurations. Therefore, it either inhibits or prevents a reduction of the space in between adjacent chains and/or sheets. inhibits a decrease in the free volume of the newly made metallo-CMS membrane over time, and inhibits the separation layer from densifying. The practical consequence of this phenomenon is to inhibit or prevent the otherwise expected aging effect and associated decrease in permeance that is exhibited by conventional CMS membranes. Typically, the aging effect may be observed in conventional CMS membranes one week after manufacture. Thus, the aging prevention or inhibition effect of the invention may similarly be observed one week after manufacture.

Because the metal cations are relatively immobilized between adjacent polyimide chains, the metal cations are not easily washed out of the fiber during any rinsing of the green fiber prior to pyrolysis. During pyrolysis, metal cations complexed between different polymer chains become bonded to the resultant carbon chains and/or graphite-like sheets.

The precursor hollow fiber membrane may be monolithic, that is, the hollow fiber membrane may be made up a single composition. Alternatively, the precursor hollow fiber membrane may have a composite structure including a core surrounded by a sheath layer.

Descriptions of how each of the above-mentioned now follows.

For monolithic fibers, the core spin dope composition comprises a polymeric material dissolved in a solvent and optionally one or more additives. A bore fluid is fed into a channel leading to the circular opening of a spinneret, and upon ejection from the spinneret, forms a cylindrical fluid stream positioned concentrically within the fibers during extrusion of the fibers. The bore fluid is typically water that optionally may include minor amounts of solvent. The core spin dope composition is fed into a channel of the spinneret leading to an annular opening surrounding the circular opening through which the bore fluid is ejected. The core spin dope composition is extruded from the annular opening around the cylindrical stream of ejected bore fluid to form the nascent hollow fiber. Suitable values for various process parameters for spinning hollow fibers (such as the outside diameters of the circular and annular openings, the temperatures of the core spin dope composition during delivery to the spinneret and during extrusion, and the viscosity of the core spin dope composition within the spinneret and the desired fiber properties) are well-known in the field of phase inversion hollow fiber spinning.

Upon extrusion from the spinneret, the nascent polymeric hollow fiber is passed through an air (or inert gas) gap and immersed in a suitable liquid coagulant bath. The polymer loading and amounts of solvent and non-solvent are carefully controlled in order to produce a single phase that is close to binodal. That way, as the ejected bore fluid and extruded spin dope composition exit the spinneret and traverse through an air gap, solvent evaporating from the core spin dope composition either causes the exterior of the dope solution to solidify or brings it closer to solidification to ultimately form an ultrathin, dense skin layer. The coagulation bath (also known as the coagulant) constitutes a non-solvent or a poor solvent for the polymer while at the same time a good solvent for the solvent within the core spin dope composition. As the nascent fiber is plunged into a coagulant bath containing non-solvent, exchange of solvent and non-solvent from the fiber to the bath and vice-versa completes the solidification of the fiber to form a two-phase sub-structure of solid polymer and liquid solvent/non-solvent. In this manner, the liquid coagulant bath facilitates phase inversion (i.e., solidification) of the still-dissolved core spin dope polymer.

The solidified monolithic fiber is then withdrawn from the liquid coagulant bath and typically wound onto a rotating take-up roll, drum, spool, bobbin or other suitable conventional collection device. Before or after collection, the fiber is optionally washed to remove non-complexed salts, solvent and/or non-solvent from the solidified fiber (hereinafter "the wash"). It may be performed as a continuous process (upon the continuously drawn fiber) or a batch process (upon a length of the drawn fiber).

The wash may be performed in one or more stages (i.e., one or more wash liquids). Each wash liquid may be used in one or more steps. These wash liquid(s) function to remove residual additives and solvent from the fiber that was not removed in the coagulation bath and to displace from the fiber any solvents or non-solvents having too high a surface tension. This is to minimize pore collapse in the fiber upon drying. The first wash liquid is typically comprised of the same non-solvent as the coagulation bath (typically, water) and performs the function of removing any solvent and non-complexed salts from the fiber that were not already removed by the coagulation bath. Subsequent wash liquids may perform the function of displacing the first wash liquid from the fiber with a liquid (typically an alcohol) with a liquid that has a lower surface tension than the first wash liquid. Further wash liquids may perform the function of displacing the second wash liquid from the fiber with a liquid (typically a hydrocarbon) that has a lower surface tension than the second wash liquid. If the fiber is allowed to dry while impregnated with a liquid having too high a surface tension, pores in the fiber will collapse, leading to unsatisfactorily decreased flux in the resultant polymeric hollow fiber.

After collection of the monolithic solidified fiber upon the roll, drum, spool, bobbin or other suitable collection device, the fiber is dried in order to remove any remaining solvent(s) or non-solvent).

For co-extruded composite fibers, the core spin dope composition comprises the polymeric material, intended for the core, dissolved in a solvent. The sheath spin dope composition comprises a polymeric material, intended for the separation layer, dissolved in a solvent. Either or both of the core and sheath spin dope compositions may include other optional additives such as fillers and/or salts. A bore fluid is fed into a channel leading to the circular opening of the spinneret, and upon ejection from the spinneret, forms a cylindrical fluid stream positioned concentrically within the fibers during extrusion of the fibers. The bore fluid may include the solvent of the core dope composition (for example, NMP), a different solvent, water, or mixtures thereof. The core spin dope composition is fed into a channel of the spinneret leading to the annular opening surrounding the circular opening through which the bore fluid is ejected, while the sheath spin dope composition is fed into a channel of the spinneret leading to the annular opening surrounding the annular opening through which the core spin dope composition is extruded. The core and sheath spin dope compositions extruded from their respective annular opening around the cylindrical stream of ejected bore fluid form the nascent hollow fiber. Suitable values for various process parameters for spinning hollow fibers (such as the outside diameters of the circular and annular openings, the temperatures of the core spin dope composition during delivery to the spinneret and during extrusion, and the viscosity of the core spin dope composition within the spinneret and the desired fiber properties) are well-known in the field of phase inversion hollow fiber spinning.

Upon extrusion from the spinneret, the nascent polymeric hollow fiber is passed through an air (or inert gas) gap and immersed in a suitable liquid coagulant bath. The polymer loading and amounts of solvent and non-solvent are carefully controlled in order to produce a single phase in each of the core and sheath portions of the extruded spin dope compositions that is close to binodal. That way, as the ejected bore fluid and extruded spin dope compositions exit the spinneret and traverse through an air gap, solvent evaporating from the sheath spin dope composition either causes the exterior of the dope solution to solidify or brings it closer to solidification to ultimately form an ultrathin, dense skin layer. The coagulation bath (also known as the coagulant) constitutes a non-solvent or a poor solvent for the polymers of the core and sheath spin dope compositions while at the same time a good solvent for the solvent within the core and sheath spin dope compositions. As the nascent fiber is plunged into a coagulant bath containing non-solvent, exchange of solvent and non-solvent from the fiber to the bath and vice-versa completes the solidification of the fiber to form a two-phase sub-structure of solid polymer and liquid solvent/non-solvent in each of the core and sheath. In this manner, the liquid coagulant bath facilitates phase inversion (i.e., solidification) of the still-dissolved core spin dope polymer.

Similar to the monolithic fibers, the solidified composite (co-extruded) fiber is then withdrawn from the liquid coagulant bath and typically wound onto a rotating take-up roll, drum, spool, bobbin or other suitable conventional collection device. Before or after collection, the fiber is likewise optionally washed. After collection of the composite (co-extruded) solidified fiber upon the roll, drum, spool, bobbin or other suitable collection device, the fiber is similarly dried in order to remove any remaining solvent(s) or non-solvent).

For coated composite fibers, the core spin dope composition comprises a polymeric material dissolved in a solvent. It may include other optional additives such as fillers and/or salts. A bore fluid is fed into a channel leading to the circular opening of the spinneret, and upon ejection from the spinneret, forms a cylindrical fluid stream positioned concentrically within the fibers during extrusion of the fibers. The bore fluid may include the solvent of the core dope composition (for example, NMP), a different solvent, water, or mixtures thereof. The core spin dope composition is fed into a channel of the spinneret leading to the annular opening surrounding the circular opening through which the bore fluid is ejected. The core spin dope composition is extruded from the annular opening around the cylindrical stream of ejected bore fluid to form the nascent hollow fiber. Suitable values for various process parameters for spinning hollow fibers (such as the outside diameters of the circular and annular openings, the temperatures of the core spin dope composition during delivery to the spinneret and during extrusion, and the viscosity of the core spin dope composition within the spinneret and the desired fiber properties) are well-known in the field of phase inversion hollow fiber spinning.

Upon extrusion from the spinneret, the nascent polymeric (as of yet uncoated) hollow fiber is passed through an air (or inert gas) gap and immersed in a suitable liquid coagulant bath. The polymer loading and amounts of solvent and non-solvent are carefully controlled in order to produce a single phase that is close to binodal. That way, as the ejected bore fluid and extruded spin dope composition exit the spinneret and traverse through an air gap, solvent evaporating from the dope solution either causes the exterior of the dope solution to solidify or brings it closer to solidification to ultimately form an ultrathin, dense skin layer. The coagulation bath (also known as the coagulant) constitutes a non-solvent or a poor solvent for the polymer while at the same time a good solvent for the solvent within the core spin dope composition. As the nascent fiber is plunged into a coagulant bath containing non-solvent, exchange of solvent and non-solvent from the fiber to the bath and vice-versa completes the solidification of the fiber to form a two-phase sub-structure of solid polymer and liquid solvent/non-solvent. In this manner, the liquid coagulant bath facilitates phase inversion (i.e., solidification) of the still-dissolved core spin dope polymer.

Similar to the monolithic and co-extruded composite fibers, the solidified composite (coated) fiber is then withdrawn from the liquid coagulant bath and typically wound onto a rotating take-up roll, drum, spool, bobbin or other suitable conventional collection device. Before or after collection, the fiber is likewise optionally washed. After collection of the composite (co-extruded) solidified fiber upon the roll, drum, spool, bobbin or other suitable collection device, the fiber is coated with a coating solution of a polymer, intended for the separation layer, dissolved in a solvent. The coated fiber is subsequently dried to evaporate the solvent of the coating solution to yield the solid coating making up the separation layer. Prior to coating, the as of yet uncoated) fiber is optionally dried in order to remove any remaining solvent or non-solvent.

The core and/or sheath spin dope compositions typically comprises 15-35 wt % (or 18-30 wt % or even 22-28 wt %) of a polymer or polymer blend dissolved in 85-65 wt % (or 82-70 wt % or even 78-72 wt %) of a solvent, and optionally, 1-5 wt % of pore-forming salts and one or more additives such as polyvinylpyrollidone for enhancing removal of water from the coagulated fiber. The type of polyimide for use as the polymer (or as part of the polymer blend) of the core and/or sheath spin dopes is not limited. Rather, any polyimide known (or hereafter newly developed) in the field of polymeric hollow fiber membranes may be used.

Typically, the polyimide is any one of the polyimide polymers or copolymers disclosed by U.S. Pat. No. 8,617, 292 B2, the polyimide polymer or copolymers of which are incorporated herein by reference. The polyimide may be blended with any other polymer known in field of polymeric hollow fiber membranes. Preferred polyimides include 6FDA:BPDA/DAM, 6FDA/mPDA:DABA, 6FDA/DETDA:DABA, Matrimid, Kapton, and P84. 6FDA:BPDA/DAM, shown below, is a polyimide synthesized by thermal imidization from three monomers: 2,4,6-trimethyl-1,3-phenylene diamine (DAM), 2,2'-bis(3,4-dicarboxyphenyl hexafluoropropane) (6FDA), and 3,3',4,4'-biphenyl tetracarboxylic acid dianhydride (BPDA). 6FDA:BPDA/DAM is a polyimide made up repeating units of 6FDA/DAM and BPDA/DAM:

Matrimid consists of repeating units of the following formula:

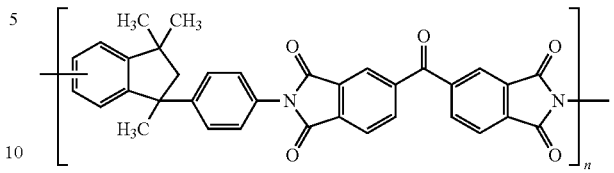

Suitable solvents include those in which at least 98 wt % of the polymer (or blend of polymers) of the core and/or sheath spin dope solution (or composition) is solubilized by the solvent. Typical examples include, for example, dichloromethane, tetrahydrofuran (THF), N-methyl-2-pyrrolidone

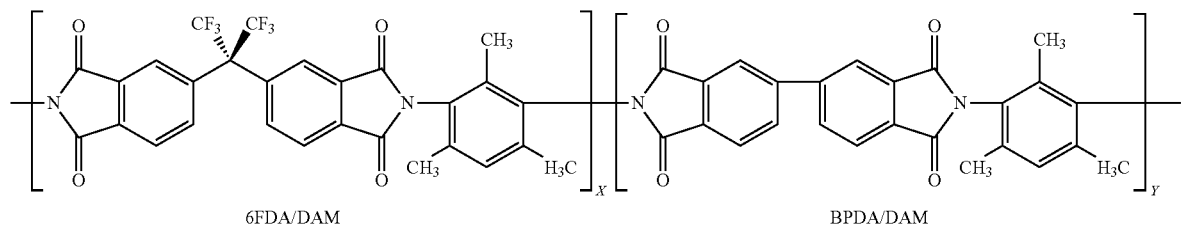

6FDA/DAM  BPDA/DAM

6FDA/mPDA:DABA is a polyimide synthesized by thermal imidization from three monomers: 2,2'-bis(3,4-dicarboxyphenyl hexafluoropropane) (6FDA), 1,3-phenylenediamine (mPDA), and 3,5-diaminobenzoic acid (DABA). 6FDA/DETDA:DABA is a polyimide synthesized by thermal imidization from three monomers: 2,2'-bis(3,4-dicarboxyphenyl hexafluoropropane) (6FDA), 2,5-diethyl-6-methyl-1,3-diamino benzene (DETDA), and 3,5-diaminobenzoic acid (DABA). Matrimid has the repeating units of the following formula:

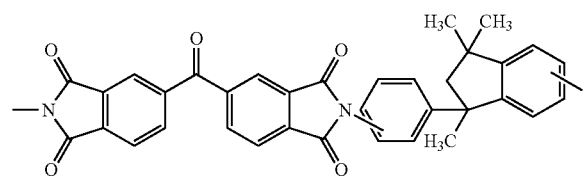

Kapton is poly (4,4'-oxydiphenylene-pyromellitimide). P84 consists of repeating units of the following formula:

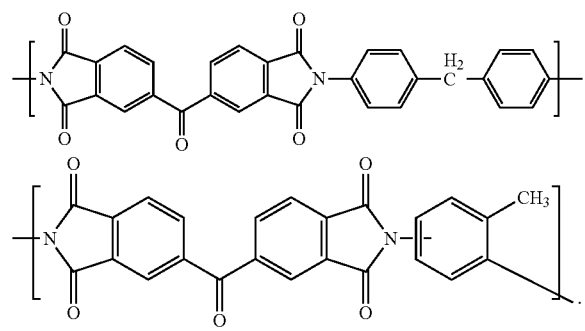

(NMP), N,N-dimethylacetamide (DMAC), N,N-dimethylformamide (DMF), dimethyl sulfoxide (DMSO), gamma-butyrolactone (BLO), glycol ethers or esters, and mixtures thereof.

The metal cations may be introduced into the green fiber according to any one, two or three of the following four techniques. They may even be introduced into the green fiber according to all of the following four techniques. The metal cations may be sourced from either a salt of the metal or a metalorganic compound (i.e., a complex of the metal cation and organic anions).

In the first technique, the metal salt or metalorganic is dissolved in the solvent of core and/or sheath spin dope composition(s) used to form the nascent fiber, or in the case of a metal salt or metalorganic that is relatively insoluble in the dope solvent, it may instead be suspended in the spin dope composition(s). In the case of composite hollow fiber membranes, the metal salt or complex may be dissolved or suspended in the core spin dope composition, the sheath spin dope composition, or each of the core and sheath spine dope compositions. If dissolved or suspended in each of the core and spin dope compositions, the metal salts or complexes in the core and sheath may be the same or different and may be present at a same or different concentration.

In the first technique, the metal salt or metalorganic is present (either dissolved or suspended in the solvent or solvents) in the core and/or sheath spin dope compositions in amounts sufficient to yield at least 1% cross-linking of the polyimide in the green fiber. For example, 0.86 g of iron (III) acetylacetonate is theoretically capable of resulting in 1% cross-linking of 578 g of Matrimid assuming that each iron cation cross-links with three separate diamine-based repeating units of the Matrimid and further assuming that 100% cross-linking means that all of the diamine-based repeating units are cross-linked with iron cations. One of ordinary skill in the art will recognize that there are multiple ways known in the polymer arts of characterizing the degree of cross-linking that may be used to determine that of the polyimide of the green fiber. Greater concentrations may be included in the spin dope compositions so long as they do not negatively affect the stability of the spine dope composition (i.e., they do not cause the polyimide to precipitate within the spin dope composition prior to spinning or cause the spin dope composition to become too viscous). Any additional amounts of metal cations that do not complex with the polyimide will simply be removed in the coagulation bath, and if practiced, in the water and/or solvent wash.

In the first technique, the metal salt or metalorganic is typically dissolved in the solvent or solvents of the spin dope composition in which it is present. This allows the metal cations to be more uniformly distributed within the core and/or sheath of the resultant polymeric hollow fiber membrane and, correspondingly, more uniformly distributed within the core and/or sheath of the final CMS membrane. We believe that the aging inhibition effect of the metal cations within the CMS membrane is enhanced when they are more uniformly distributed within the CMS membrane. If the metal salt or metalorganic is not dissolved in the solvent, localized regions may occur in the precursor hollow fiber membrane where there is an over-abundance of metal salt in comparison to the availability of electronegative regions of the polyimide for complexation.

With continuing regard to the first technique, as the nascent fiber from the spinneret is precipitated in the coagulation bath, dissolution of the metal cations by the coagulation bath and removal of them from the fiber is inhibited because they have already been immobilized via complexation with the polyimide backbone prior to extrusion from the spinneret. Similarly, as the precipitated fiber is washed to remove spin dope solvent, dissolution of the metal cations by the wash and removal of them from the fiber is likewise inhibited.

The first technique is advantageous because it does not require any equipment or process steps (other than adding the metal salt or metalorganic to a mixer for mixing the spin dope composition at hand) in addition to conventional equipment and process steps involved in spinning hollow fiber membranes. Because of this, it is easy to retrofit an already existing system or process for spinning precursor fibers (without metal cations) so as to produce the green fibers of the invention. The first technique is additionally advantageous because it provides an additional tool for controlling viscosity or pore-formation in the green fiber.

In the second technique, a metal salt or metalorganic may be dissolved in the bore fluid that is extruded from the spinneret to form the bore of the hollow fiber. The bore fluid and dissolved cations impregnate the nascent fiber from the bore side as that fiber exits the spinneret. As is the case in the first technique, dissolution of the metal cations (and removal of them from the fiber) by the coagulation bath or solvent wash is inhibited due to immobilization of the metal cations with the polyimide backbone. In this second technique, because the metal cations are introduced via the bore fluid, there may be a gradient of metal cation concentration that decreases in the radial direction from the inner surface of the bore to the outer surface of the fiber.

In the second technique, the metal salt or metalorganic is present in the bore fluid at a concentration to yield at least 1% cross-linking of the polyimide in the green fiber. Greater concentrations may be included in the bore fluid because any additional amounts of metal cations that do not complex with the polyimide will simply be removed in the coagulation bath, and if practiced, in the water and/or solvent wash.

The second technique is advantageous because of its simplicity. An existing system or process for producing green fibers without the metal cations of the invention may be easily retrofitted by dissolving the metal salt or metalorganic in the bore fluid. It does not affect the kinetics of skin formation in the air gap and coagulation bath. More importantly, however, the second technique is advantageous because it allows the metal cations to be incorporated more thoroughly in the supporting sub-structure (i.e., the inner region) of the fiber as opposed to the skin (i.e., the outer region) of the fiber. If characterization of the fiber, such as electron microscopy, indicates that the aging effect is more pronounced in the supporting sub-structure, the second technique may be particularly advantageous.

In the third technique, the metal cations may be incorporated into the precipitating nascent fiber as it traverses the coagulation bath by dissolving the metal salt or metalorganic in the coagulation bath. As mentioned above, the liquid coagulant bath facilitates phase inversion (i.e., solidification) of any still-dissolved core (or both core and sheath) spin dope polymer. The coagulant constitutes a non-solvent or a poor solvent for the polymer while at the same time a good solvent for the solvent within the core spin dope composition. Exchange of solvent and non-solvent from the fiber to the bath and vice-versa causes the as-of-yet unsolidified portions of the nascent fiber to form a two-phase substructure of solid polymer and liquid solvent/non-solvent as it is drawn through the liquid coagulant bath.

With regard to the third technique, as non-solvent and solvent (if present) from the coagulation bath mix with the solvent and non-solvent (if present) inside the precipitating fiber, the metal cations dissolved in the non-solvent (or the combined non-solvent and solvent, if present) of the coagulation bath complex with electronegative regions of the polyimide backbone and thus become immobilized therein. Although an equilibrium of non-solvent (or the combined non-solvent and solvent, if present) between the precipitating fiber and the coagulation bath is established and amounts of non-solvent and solvent may exit the fiber into the coagulation bath, a substantial amount of the metal cations do not exit the fiber since they have already complexed with the polyimide. As is the case in the first and second techniques, dissolution of the metal cations (and removal of them from the fiber) by the solvent wash is inhibited due to immobilization of the metal cations with the polyimide backbone.

In the third technique, the metal salt or metalorganic is present in the coagulation bath at a concentration to yield at least 1% cross-linking of the polyimide in the green fiber. Greater concentrations may be included in the coagulation bath because any additional amounts of metal cations that do not complex with the polyimide will simply be removed in the wash, if included.

The third technique is also advantageous because of its simplicity. An existing system or process for producing green fibers without the metal cations of the invention may be easily retrofitted by dissolving the metal salt or metalorganic in the coagulation bath. It may be used in the case of any spin dope composition because it does not affect the spin dope composition stability or viscosity. It is also advantageous because it provides an additional tool for controlling phase inversion of the nascent fiber. More importantly, however, the third technique is advantageous because it allows the metal cations to be incorporated more thoroughly the skin (i.e., the outer region) of the fiber as opposed to in the supporting sub-structure (i.e., the inner region) of the fiber. If characterization of the fiber, such as electron microscopy, indicates that the aging effect is more pronounced in the skin, the third technique may be particularly advantageous.

In the fourth technique, the metal cations may be incorporated into the precipitated fiber as it is washed by at least one wash liquids having the cations dissolved therein. In the case of two wash liquids, the first and/or the second wash liquid may contain dissolved cations. In the case of three wash liquids, the first, the second, the third, the first and second, the first and third, the second and third, or each of the wash liquids may include the dissolved cations. While non-complexed metal cations would ordinarily be expected to be removed by the wash liquid(s), the metal cations complexed with the polyimide are not removed by the wash liquid(s) because they are immobilized. In one embodiment, the metal cations are dissolved in a washing liquid that is an alcohol. In another embodiment, the metal cations are dissolved in a washing liquid that is water. In yet another embodiment, the metal cations are dissolved in a washing liquid that is a hydrocarbon. Any combination of these three embodiments may be used.

In the fourth technique, the metal salt or metalorganic is present in the wash liquid at a concentration to yield at least 1% cross-linking of the polyimide in the green fiber. Greater concentrations may be included in the wash fluid because any additional amounts of metal cations that do not complex with the polyimide will simply be removed in the wash.

The fourth technique is also advantageous because of its simplicity. An existing system or process for producing green fibers without the metal cations of the invention may be easily retrofitted by dissolving the metal salt or metalorganic in one or more wash liquids. It may be used in the case of any spin dope composition because it does not affect the spin dope composition stability or viscosity. It also does not affect the kinetics of skin formation in the coagulation bath.

One may determine if the cations have been substantially removed by the coagulation bath and/or the wash liquid(s) by any of a wide variety of well-known chemical or polymer characterization tests. For example, the metallopolyimide precursor fiber made according to the invention may be immersed in a solvent and its resistance to dissolution may be observed in comparison to a control precursor fiber that does not include the complexed metal cations of the invention but which is otherwise made in the same manner as the metallopolyimide precursor fiber. Alternatively, the color of the metallopolyimide precursor fiber made according to the invention may compared to the color of a control fiber that does not include the complexed metal cations of the invention but which is otherwise made in the same manner as the metallopolyimide precursor fiber. Alternatively, the presence of the metal cations in a precursor metallopolyimide fiber (or metallo-CMS fiber according to the invention) may be observed with atomic absorption spectrometry in comparison to a control fiber (or control CMS fiber) that does(did) not contain the metal cations of the invention but which was otherwise made in the same manner as the metallopolyimide precursor (or metallo-CMS) fiber.

The metal salt is a salt of any transition metal, in a +2 or +3 oxidation state, and an inorganic anion. Transition metals have incomplete 3d, 4d, and 5d shells exhibit numerous oxidation states increasing in increments of 1 instead of increments of 2 exhibited by main group elements having more than one oxidation state. More importantly, transition metals have an unmatched tendency to form coordination compounds with Lewis bases. A coordination compound (otherwise known as a "complex") is formed when a Lewis base (i.e., the ligand) is attached to a Lewis acid (in this case, the metal cation). Because the d shells of these cations are electron-deficient, complexation with the electron-rich domains of the polyimide is allowed. Typical non-limiting examples transition metals include Sc, Ti, Va, Cr, Mn, Fe, Co, Ni, Cu, Zn, Y, Zr, Nb, Mo, Ru, Rh, Pd, Ag, Cd, Hf, Ta, W, Re, Os, Ir, Pt, and Au. Typical non-limiting examples of inorganic anions include sulfate, nitrate, nitrite, chloride, chlorate, perchlorate, bromide, iodide, cyanate, isocyanate, thiocyanate, tetrafluoroborate, hexafluorophosphate, and molybdate.

The metal of the metalorganic is also a transition metal in the +2 or +3 oxidation state for the same reason as given above with respect to the metal salts of the invention. Typical non-limiting examples transition metals include Sc, Ti, Va, Cr, Mn, Fe, Co, Ni, Cu, Zn, Y, Zr, Nb, Mo, Ru, Rh, Pd, Ag, Cd, Hf, Ta, W, Re, Os, Ir, Pt, Au, and Gd. Typical non-limiting examples of organic ligands include acetylacetonate, acetate, oxalate, and citrate.

While any of a wide variety of transition metal salts or transition metalorganics may be used in the invention, particularly ones are typically selected based upon their solubility in the solvents and/or non-solvents used to introduce the metal cations into the fiber: the solvent of the spin dope composition, the bore fluid, the coagulation bath, and the solvent wash. The metal salt is preferably cheap and not corrosive or toxic.

The cation of the transition metal salt or metalorganic is more typically Fe(ii), Fe(iii), Ag(ii), Ag(iii), Zn(ii), or Zn(iii). The Fe(iii) cation may be chosen for its ability to catalyze the carbonization of the polymer towards graphite sheets and bond with those sheets to result in a metal carbide. Fairly typical metal salts or metalorganics include iron (Ill) nitrate, iron (Ill) acetylacetonate, and zinc (II) acetylacetonate.

We believe that integration of metal atoms into the separating layer of the CMS membrane will impede or prevent physical aging and at least stabilize permeance over time. Complexation and immobilization of the metal cations in the polymer fiber provides two main advantages: the first of which may be realized prior to pyrolysis and the second of which may be realized after pyrolysis. First, because the metal cations are immobilized, their loss during subsequent washing or handling, prior to pyrolysis, is inhibited or prevented. Second, agglomeration of the metal during pyrolysis is inhibited or prevented. Agglomeration may compromise the mechanical integrity of the CMS fiber. Since the metal cations are homogenously dispersed within the fiber on a molecular level, agglomeration of the metal into visible "islands" or coatings of metal is already severely retarded. In the absence of homogenous distribution, agglomeration would already have a "head start" prior to pyrolysis. Also, since the metal cations are also immobilized within the precursor fiber, their position within the polymeric matrix is stabilized during pyrolysis, thereby further inhibiting agglomeration. In the absence of immobilization, it is believed that the metal may flow and agglomerate because they are not chemically bound.

Complexation and immobilization can be observed by a change in the color of the fiber or by reduced solubility of the polymeric matrix of the fiber in a solvent after impregnation with the metal cations.

It should be mentioned that complexation and immobilization of the metal cations within the polyimide chain may be enhanced if the polyimide includes some negatively charged groups resulting from incomplete imidization routes. Additionally, the polyimide may include a small amount of a carboxylic acid-functionalized diamine monomeric units in order to facilitate complexation with the metal cations. For example, at least some of the diamine moieties in the polyimide can be based upon 3,5-diaminobenzoic acid (DABA).

The precursor hollow fibers are at least partially, and optionally fully, pyrolyzed to form the final CMS membrane.

Pyrolysis may be optionally carried out under vacuum typically ranging from about 0.01 mm Hg to about 0.10 mm Hg or even as low as 0.05 mm Hg or lower. Alternatively, pyrolysis is carried out at a pressure of about atmospheric.

Typically, the pyrolysis atmosphere inside the chamber is an inert gas having no more than a relatively low concentration of oxygen, such as those disclosed by US 2011/0100211.

While the pyrolysis temperature may range from 500-1,000° C., typically it is between about 450-800° C. As one particular example, the pyrolysis temperature may be maintained between about 500-550° C. The pyrolysis includes at least one ramp step whereby the temperature is raised over a period of time from an initial temperature to a predetermined temperature at which the polymer is pyrolyzed and carbonized. The ramp rate may be constant or follow a curve. The pyrolysis may optionally include one or more pyrolysis soak steps (i.e., the pyrolysis temperature may be maintained at a particular level for a set period of time) in which case the soak period is typically between about 1-10 hours or optionally from about 2-8 or 4-6 hours.

An illustrative heating protocol may include starting at a first set point (i.e., the initial temperature) of about 50° C., then heating to a second set point of about 250° C. at a rate of about 3.3° C. per minute, then heating to a third set point of about 535° C. at a rate of about 3.85° C. per minute, and then a fourth set point of about 550° C. at a rate of about 0.25 degrees centigrade per minute. The fourth set point is then optionally maintained for the determined soak time. After the heating cycle is complete, the system is typically allowed to cool while still under vacuum or in the controlled atmosphere provided by purging with the low oxygen inert purge gas.

Another illustrative heating protocol (for final temperatures up to 550° C. has the following sequence: 1) ramp rate of 13.3° C./min from 50° C. to 250° C.; 2) ramp rate of 3.85° C./min from 250° C. to 15° C. below the final temperature ($T_{max}$); 3) ramp rate of 0.25° C./min from $T_{max}$-15° C. to $T_{max}$; 4) soak for 2 h at $T_{max}$.

Yet another illustrative heating protocol (for final temperatures of greater than 550° C. and no more than 800° C. has the following sequence: 1) ramp rate of 13.3° C./min from 50° C. to 250° C.; 2) ramp rate of 0.25° C./min from 250° C. to 535° C.; 3) ramp rate of 3.85° C./min from 535° C. to 550° C.; 4) ramp rate of 3.85° C./min from 550° C. to 15° C. below the final temperature $T_{max}$; 5) ramp rate of 0.25° C./min from 15° C. below the final temperature $T_{max}$ to $T_{max}$; 6) soak for 2 h at $T_{max}$.

Still another heating protocol is disclosed by U.S. Pat. No. 6,565,631. Its disclosed heating protocol is incorporated herein by reference.

After the heating protocol is complete, the membrane is allowed to cool in place to at least 40° C. while still under vacuum or in the inert gas environment.

Following the pyrolysis step and allowing for any sufficient cooling, the gas separation module is assembled. The final membrane separation unit can comprise one or more membrane modules. These can be housed individually in pressure vessels or multiple modules can be mounted together in a common housing of appropriate diameter and length. The module contains a suitable number of pyrolyzed CMS membrane fibers to form a separation unit typically potted with a thermoset resin (or other suitable tubesheet material) within a cylindrical housing to form the tubesheet (s). The number of fibers bundled together will depend on inherent CMS membrane permeances and selectivities, fiber diameters, lengths, on desired throughput, equipment costs, and other engineering considerations well understood by those of ordinary skill in the art. The fibers may be held together by any means known in the field. This assembly is typically disposed inside a pressure vessel such that one end of the fiber assembly extends to one end of the pressure vessel and the opposite end of the fiber assembly extends to the opposite end of the pressure vessel. The tubesheet and fiber assembly is then fixably or removably affixed to the pressure vessel by any conventional method to form a pressure tight seal.

For industrial use, a permeation cell or module made using the pyrolyzed CMS membrane fibers may be operated, as described in U.S. Pat. No. 6,565,631, e.g., as a shell-tube heat exchanger, where the feed is passed to either the shell or tube side at one end of the assembly and the product is removed from the other end. For maximizing high pressure performance, the feed is advantageously fed to the shell side of the assembly at a pressure of greater than about 10 bar, and alternatively at a pressure of greater than about 40 bar. The feed may be any gas having a component to be separated, such as: a natural gas feed containing an acid gas (e.g., $CO_2$ or $H_2S$); air; or a mixture of an olefin and paraffin.

EXAMPLE

Two precursor fibers of Matrimid were spun. The precursor fiber according to the invention was coagulated in a water bath containing dissolved iron. The control fiber was coagulated in a water bath not containing iron. Both fibers were immersed dichloromethane. While the control fiber completely dissolved, the fiber according to the invention could still be observed as remaining in filamentary form. Based upon this, we believe that a more robust structure results from the complexation of the iron cations and the electronegative regions of the polyimide.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for producing a metallopolyimide precursor fiber for an aging-resistant carbon molecular sieve hollow fiber membrane having improved selectivity, comprising the steps of:
    ejecting a bore fluid from a circular opening in a hollow fiber spinneret;
    extruding a core spin dope composition from an annular opening that surrounds the circular opening, the core spin dope composition comprising a polyimide dissolved in a solvent;
    allowing the extruded core spin dope composition to traverse a gap containing a gas to produce a nascent hollow fiber;
    allowing the nascent hollow fiber to travel through a coagulation bath of a cations of a transition metal dissolved in a non-solvent in which still-dissolved portions of the polyimide in the nascent hollow fiber are solidified via phase inversion, wherein the cations diffuse into the solidified fiber where they complex with electronegative regions of the polyimide; and
    drying the solidified hollow fiber.

2. The method of claim 1, further comprising the step of washing the solidified hollow fiber with a wash liquid so as to remove the solvent from the solidified hollow fiber, wherein the complexed cations are not substantially removed from the solidified hollow fiber by the wash liquid.

3. The method of claim 1, wherein the transition metal is selected from the group consisting of Sc, Ti, Va, Cr, Mn, Fe, Co, Ni, Cu, Zn, Y, Zr, Nb, Mo, Ru, Rh, Pd, Ag, Cd, Hf, Ta, W, Re, Os, Ir, Pt, and Au.

4. The method of claim 3, wherein the transition metal cations are in a +2 or +3 oxidation state.

5. The method of claim 3, wherein the cation is selected from the group consisting of Fe(ii), Fe(iii), Ag(i) Ag(ii), Ag(iii), Zn(ii), and Zn(iii).

6. The method of claim 1, wherein the coagulation bath comprises water and a salt of the cation and an inorganic anion, the inorganic anion being selected from the group consisting of sulfate, nitrate, nitrite, chloride, chlorate, perchlorate, bromide, iodide, cyanate, isocyanate, thiocyanate, tetrafluoroborate, hexafluorophosphate, and molybdate.

7. The method of claim 6, wherein the anion is nitrate.

8. The method of claim 7, wherein the cation is Fe(iii).

9. The method of claim 1, wherein the coagulation bath comprises water and a metalorganic, the metalorganic being a complex of the cation and an organic ligand, the ligand being selected from the group consisting of acetylacetonate, acetate, oxalate, and citrate.

10. The method of claim 9, wherein the ligand is acetylacetonate.

11. The method of claim 10, wherein the cation is Fe(iii) or Zn(ii).

12. The method of claim 11, wherein the polyimide is 6FDA/BPDA:DAM and the metalorganic in the coagulation bath is tris(acetylacetonato) iron(III).

13. A plurality of the dried solidified hollow fibers produced by the method of claim 1.

14. A method for producing an aging-resistant CMS hollow fiber membranes having improved selectivity, comprising the step of pyrolyzing the dried solidified hollow fibers of claim 13.

15. The aging-resistant CMS hollow fiber membranes produced by the method of claim 14.

16. A method for separating a gas mixture, comprising the steps of feeding a gas mixture to a CMS membrane module comprising a plurality of the aging-resistant CMS hollow fiber membranes of claim 15, withdrawing a permeate gas from the CMS membrane module that is enriched in at least one gas relative to the gas mixture, and withdrawing a non-permeate gas from the CMS membrane module that is deficient in said at least one gas relative to the gas mixture.

* * * * *